(12) United States Patent
Lautenbacher

(10) Patent No.: US 6,907,450 B1
(45) Date of Patent: Jun. 14, 2005

(54) METHOD AND APPARATUS FOR THE SYNCHRONIZED REPRESENTATION OF NETWORK CONTENTS

(75) Inventor: Markus Lautenbacher, Oberammergau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/463,521

(22) PCT Filed: Jul. 22, 1998

(86) PCT No.: PCT/EP99/04591

§ 371 (c)(1),
(2), (4) Date: Jan. 24, 2000

(87) PCT Pub. No.: WO99/05612

PCT Pub. Date: Feb. 4, 1999

(30) Foreign Application Priority Data

Jul. 25, 1997 (EP) .............................. 97123878

(51) Int. Cl.[7] ....................... G06F 15/16; G06F 15/173; H04L 12/16
(52) U.S. Cl. ....................... 709/204; 709/205; 709/206; 709/207; 709/223; 709/238; 709/248; 370/260; 370/261; 370/262
(58) Field of Search ............................... 709/204, 248, 709/242, 9, 208, 223, 238, 224, 205, 206, 207; 707/10, 512; 370/260, 396, 261, 262; 345/233; 386/69; 463/25

(56) References Cited

U.S. PATENT DOCUMENTS

| 5,533,021 A | * | 7/1996 | Branstad et al. ............ 370/396 |
| 5,613,032 A | * | 3/1997 | Cruz et al. ..................... 386/69 |
| 5,634,011 A | * | 5/1997 | Auerbach et al. ........... 709/242 |
| 5,647,022 A | * | 7/1997 | LeCun et al. ................ 382/156 |
| 5,762,552 A | * | 6/1998 | Vuong et al. .................. 463/25 |
| 5,774,668 A | * | 6/1998 | Choquier et al. ........... 709/223 |
| 5,796,393 A | * | 8/1998 | MacNaughton et al. .... 345/733 |
| 5,862,328 A | * | 1/1999 | Colyer ....................... 709/203 |
| 5,961,590 A | * | 10/1999 | Mendez et al. ............. 709/206 |
| 5,974,238 A | * | 10/1999 | Chase, Jr. ................... 709/248 |
| 6,161,137 A | * | 12/2000 | Ogdon et al. ............... 709/224 |
| 6,178,443 B1 | * | 1/2001 | Lin ........................... 709/208 |
| 6,199,096 B1 | * | 3/2001 | Mirashrafi et al. .......... 709/202 |
| 6,230,172 B1 | * | 5/2001 | Purnaveja et al. .......... 707/512 |
| 6,397,217 B1 | * | 5/2002 | Melbin ........................ 707/10 |
| 6,418,439 B1 | * | 7/2002 | Papierniak et al. ............ 707/9 |

OTHER PUBLICATIONS

Blair et al., A Programming Model and System Infrastructure for Real–Time Synchronization in Distributed Multimedia Systems Jan. 1996, IEEE Journal on Selected Areas in Communications, vol. 14, No. 1, pp. 249–263.*

Kurt Rothermel & Tobias Helbig, Clock Hierarchies: An Abstraction for Grouping and Controlling Media Streams, Jan. 1996 IEEE Journal on Selected Areas in Communications, pp. 174–184.*

Borko Furht, Multimedia Systems: An Overview, IEEE Multimedia, Spring 1994, No. 1, pp. 47–59.*

T. Ohmori et al., Distributed Cooperative Control for Sharing Applications Based on Multiparty and Multimedia Desktop Conferencing System: MERMAID, Sep. 6, 1992.*

(Continued)

Primary Examiner—Joseph Feild
Assistant Examiner—Chau Nguyen
(74) Attorney, Agent, or Firm—McCormick, Paulding & Huber LLP

(57) ABSTRACT

A method and accompanying apparatus forms a synchronized representation of network contents within a group of users. This makes it possible to realize a series of new applications, for instance electronic commerce, electronic consulting, call centers, telelearning, and multimedia hotline.

6 Claims, 2 Drawing Sheets

OTHER PUBLICATIONS

Donald et al., "Synchronization Mechanisms for Distributed Multimedia Presentation Systems", Aug. 1995, IEEE, pp. 30–3.*

Furht, B.: "Multimedia Systems: An Overview", IEEE Multimedia, vol. 1, No. 1, (1994), pp. 47–59.

Wong, J. et al.: "Synchronization in Specification–Based Multimedia Presentations;", Software Practice & Experience, vol. 26, No. 1, (1996), pp. 71–81.

Rothermel, K. et al.: "Clock Hierarchies: An Abstraction for Grouping and Controlling Media Streams", IEEE Journal on Selected Areas in Communications, vol. 14, No. 1, (1996), pp. 174–184.

Ohmori, T. et al.: "Distributed Cooperative Control for Sharing Applications Based on Multiparty and Mutimedia Desktop Conferencing System: Mermaid", Proceedings of the International Conference on Distributed Computing Systems, (1992), pp. 538–546.

* cited by examiner-

METHOD AND APPARATUS FOR THE SYNCHRONIZED REPRESENTATION OF NETWORK CONTENTS

BACKGROUND OF THE INVENTION

FIELD OF THE INVENTION

The present invention relates to representation of multimedia contents from an Internet Provider network and more particularly, to a method and apparatus for automatically synchronizing the transmission of network contents between different clients.

The World Wide Web (WWW) is a known service in Internet Protocol (IP) based networks for representing multimedia networked contents (see FIG. 1 of the drawings).

The WWW enables a user to use multimedia contents and a wide variety of services that are offered in an IP network with the aid of a universal Graphical User Interface (GUI) that is easy to use.

The WWW is accomplished through a client-server architecture that is customary in IP networks in general. The WWW browser realizes the WWW client on the user terminal and forms the GUI to the user of the WWW. The communication between WWW client and server occurs using Hypertext Transfer Protocol (HTTP). Multimedia WWW contents are loaded on the service host by the WWW server. What is known as the Universal Resource Locator (URL) serves as address for searching WWW contents in IP networks. WWW clients, or respectively, servers are generally realized as software applications on the user terminal (e.g. personal computer), or respectively, on the service host (e.g. workstation).

Specifically, a call-up of the WWW service occurs as follow. Upon corresponding action by the user, the WWW client sets up a connection to what is known as a "well known TCP/IP port" at the service host. The WWW server that is active at the service host monitors this port that is allocated to the WWW service, registers corresponding requests, localizes the retrieved WWW contents and transmits them to the client from which the request originated. The TCP/IP connection between the WWW server and the corresponding client is then dismantled again.

As described above, requests by different WWW clients coming in at the same server are handled independently of one another.

For the reasons given, the prior art is limited to an information flow from WWW server and client, and only upon a corresponding explicit request by the client. Furthermore, automatic correlation between the information flows to different WWW clients, particularly a synchronization of the transmitted WWW contents, is not possible.

A content synchronization between WWW clients of a plurality of users is only possible by the explicit exchange of the URL that is allocated to the WWW contents as an address via a separate communication channel between the users (e.g. telephone, e-mail, etc.). The corresponding URL is manually entered by the individual users into their WWW client.

These problems and disadvantages arise not only in the WWW service used in this example, but also in any service offering a general distribution of contents that functions according to the client-server principle and that provides only "n" unsynchronized 1:1 client-server relations.

The present invention overcomes the disadvantages of the prior art through a method of synchronized representation of network contents that includes requesting service by at least one client from a plurality of clients for a groupwise synchronized representation of data network contents by a synchronization server. Other specific clients are then combined based on request by the at least one client, the specific other clients being part of the plurality of clients. The request from the at least one client is a request for groupwise synchronized representation into a synchronous multimedia session group (SMMSG). At least one request for specific network content is rerouted by a requesting client belonging to the synchronous multimedia session group to the synchronization server. The requested specific network contents are then loaded into the synchronization server and forwarded from the synchronization server to the requesting client. Finally, all clients belonging to the synchronous multimedia session group are prompted by the synchronization server to request the specific network contents in a manner similar to the requesting client.

The transmission of network contents synchronized automatically between different clients and controlled by the inventive method is quite useful and economically promising, since a series of new applications can be realized therewith Examples of such applications include electronic commerce, electronic consulting, call centers, telelearning, and multimedia hotline.

Additional advantages and novel features of the invention will be set forth in the description which follows and will become apparent to those skilled in the art upon examination of the following or may be learned by practice of the invention. The advantages of the invention may be realized and attained by means of the instrumentalities and combination particularly pointed out in the appended claims.

BRIEF DESCRIPTION OF THE DRAWINGS

Reference is made to the attached drawings, wherein.

DESCRIPTION OF THE PREFERRED EMBODIMENTS

Figure 1:
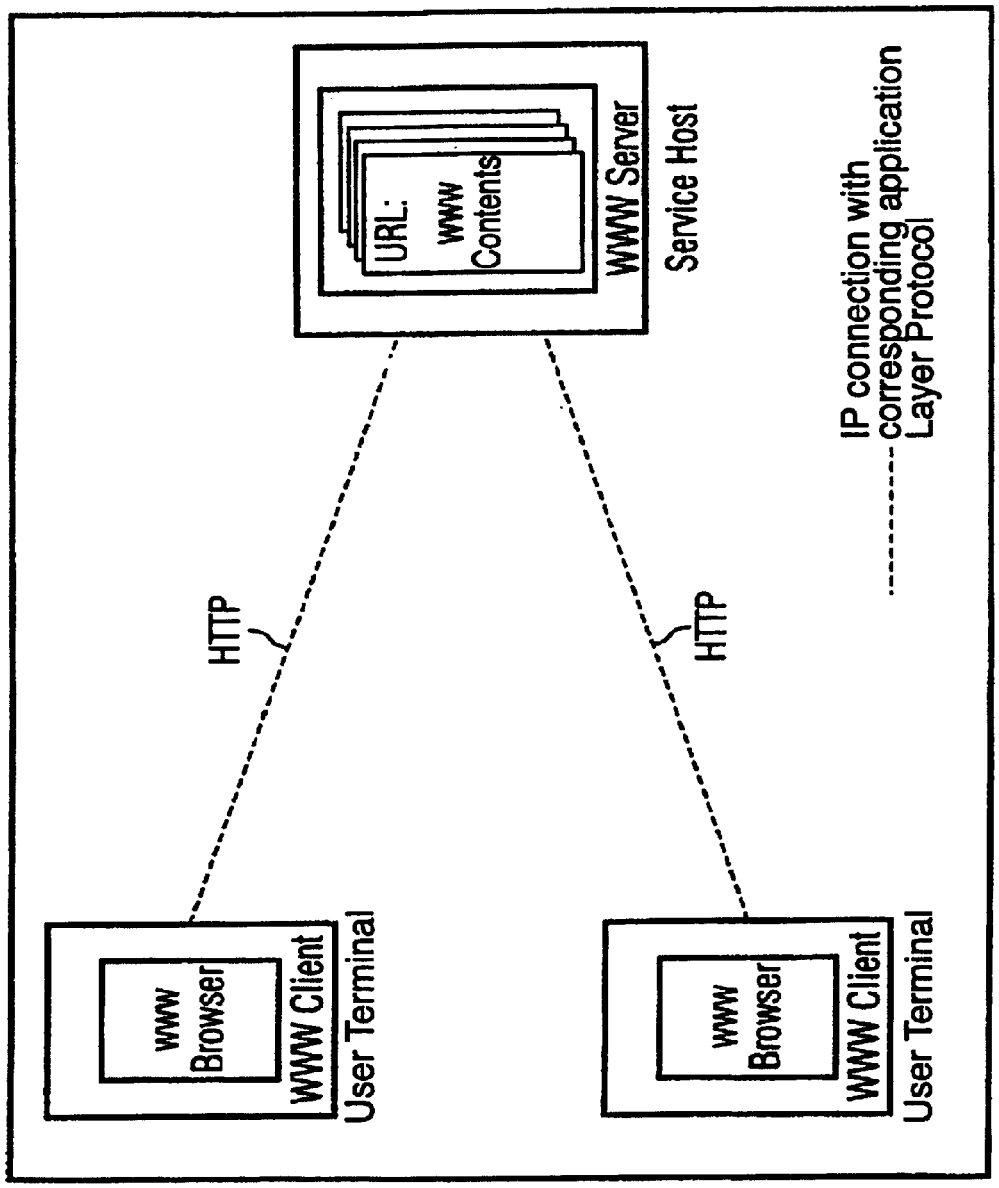
FIG. 1 is a block diagram of a conventional Internet Provider connection.
Figure 2:
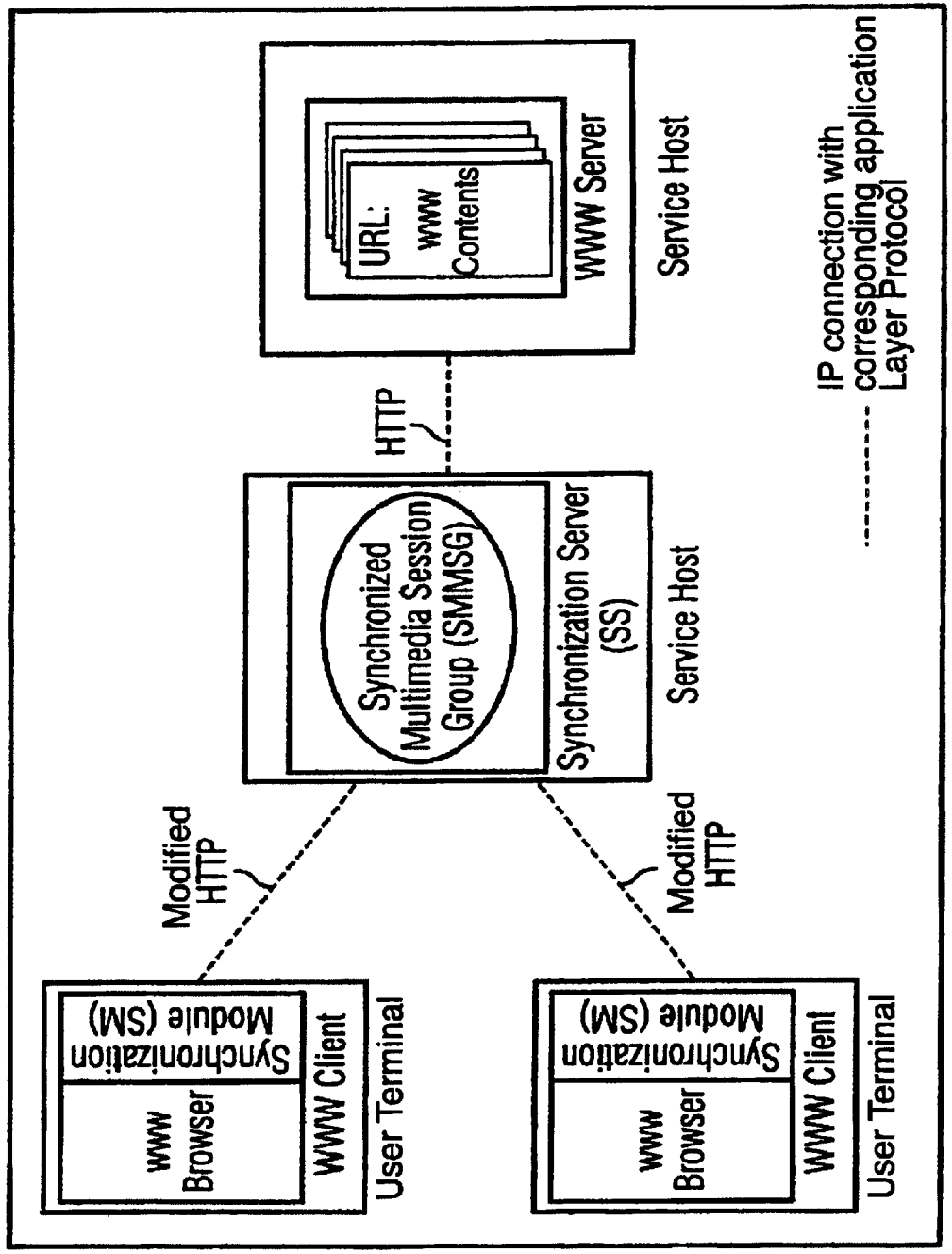
FIG. 2 illustrates a block diagram of an Internet Provider connection according to the present invention.

FIG. 2 illustrates an enhanced system architecture representing WWW contents in a synchronized manner in relation to a plurality of users.

For the sake of simplicity, the illustration is limited to two users, each being represented by a WWW client. However, the described method permits an arbitrary number of users. The invention is, of course, not limited to the example of WWW service, which is based on HTTP, but can be applied in any service that offers a general distribution of contents, and that functions according to the client-server principle, originally provided that only "n" unsynchronized 1:1 client-server relations are present and not one synchronized n:1 client-server relation.

The essential enhancements over the known WWW system architecture relate to the following components:

1. The functionality of the WWW browsers of the WWW clients to be synchronized is enhanced by a synchronization module SM. This enhancement can be accomplished according to known software techniques in a static manner by means of what are known as browser plug-ins or dynamically in the request for service by the transparent downloading of what are known as Java Applets, or respectively, ActiveX controls via the IP network.

2. An upstream synchronization server SS is connected to the known WWW servers according to FIG. 2. The synchronization server SS forms the link element between the WWW clients as enhanced by the synchronization module SM and the conventional WWW server for loading WWW contents. The synchronization server SS and the WWW servers are connected by means of HTTP via IP; the synchronization server SS and the enhanced WWW clients are connected by means of a correspondingly adapted HTTP via IP. The required enhancement of the protocol between synchronization server SS and client is carried out given the realization of the invention in a non-WWW service that likewise offers the distribution of contents.

3. Synchronization server SS and WWW server form two independent software applications that can run on the same physical service host in a parallel manner or, as illustrated in FIG. 2, on two service hosts that are distributed in the IP network.

The present embodiment is characterized in that a WWW contents for the first time by calling up a specific URL that refers to the synchronization server SS. The call-up of this URL connects the WWW client to the synchronization server SS on the corresponding service host. This first-time connection between WWW client and synchronization server SS does not require any enhancement by an adapted HTTP but, rather, is accomplished via standard HTTP.

The synchronization server then checks if a synchronization module SM is already statically installed in the WWW client and performs a dynamic installation of the synchronization module SM (discussed previously) as warranted.

The synchronization server SS logically combines all WWW clients that are to be synchronized into a "Synchronous Multimedia Session Group" SMMSG.

The allocation to an SMMSG is accomplished given a static, or dynamic installation of the synchronization module SM (cf implicit registering by the synchronization server SS of the WWW clients to be synchronized in the requesting of the service of synchronized representation.

The synchronization in a SMMSG occurs according to the following description:

The synchronization module SM in the WWW clients functions as URL re-routing. That is, a standard request according to HTTP of a client belonging to a specific SMMSG for a URL in an arbitrary WWW server is captured by the synchronization module SM and forwarded to the synchronization server SS instead.

Synchronization module SM and synchronization server SS then communicate according to a suitably adapted HTTP. In particular, the synchronization server SS receives the URL requested by the WWW client from the synchronization module SM.

The synchronization server SS loads the requested URL from the corresponding WWW server (given a corresponding URL, the WWW server can also be situated on the same service host as the synchronization server SS) on behalf of the requested WWW client.

Next, the synchronization server SS informs all synchronization modules SM belonging to a particular SMMSG that new WWW contents for the SMMSG exist. Standard HTTP already makes available mechanisms for transmitting contents from the server to the client when the client calls this content per request. When the synchronization server SS informs the synchronization module SM only that "there is something to collect" and "where", and the synchronization module SM subsequently prompts the client to call accordingly, then the actual transmission of the content is realized with standard WWW means.

The synchronization modules SM of the WWW clients belonging to a particular SMMSG prompt their corresponding WWW clients to request the new content (due to the described re-routing by the synchronization server SS), to download the contents, and to display them.

Thus contents displayed in the WWW clients belonging to a SMMSG are synchronized.

The synchronization server SS handles URL requests coming in via the SMs from the various WWW clients belonging to a SMMSG chronologically according to their arrival. That is, the SS operation corresponds to a queue operating according to the first-come-first-serve principle. The above describe is process is repeated for each request handled.

With the termination of the SM in the WWW client by the user, this leaves the corresponding SMMSG. The termination of the SM is accomplished via a corresponding icon in the control bar of the WWW browser that is generated in the installation of the SM.

For resubscribing or resumption after an interruption of an SMMSG, all WWW clients of a particular SMMSG are assigned an identical session group login identifier by the synchronization server SS. This identifier can be filed as a URL in what is known as a "bookmark" file of the WWW browser. The user then joins the corresponding SMMSG again by calling up the corresponding bookmark (through either a mouse click or other user input). Given dynamic enhancement of the WWW browser, the synchronization module SM that is required for communication with the synchronization server SS is also reinstalled per download when reapplying to the corresponding SMMSG.

An SMMSG is considered finished and is logically terminated by the synchronization server SS when the last WWW client belonging to this particular SMMSG signs off from the SMMSG.

The present embodiment affords each WWW client from the synchronized group the ability to take over the role of a "guide through WWW contents" for the rest of the clients of the corresponding SMMSG. The WWW contents requested by the current "guide" are also transferred to the remaining members of the SMMSG at the same time, achieving a synchronization of the WWW contents within an SMMSG.

In addition, the synchronization between the clients is accomplished automatically, without explicit exchanging of URLs or their manual input into the WWW client by the user.

These features make possible new applications in the area of multimedia customer service/phone sales and telelearning in IP networks such as the Internet/Intranet. A consultant/salesperson, or teacher can lead the customer/student through the multimedia contents that have been loaded on the WWW server automatically without the latter's assistance. Conversely, the customer/student can also guide the consultant/teacher to particular WWW contents if necessary. The infrastructure that is already installed in the Internet/Intranet of WWW clients and servers, including corresponding protocols, as well as user terminals and service hosts, is re-used. The necessary enhancements can be realized in independent WWW browser software modules, or autonomous server applications. This makes possible an economical and rapid conversion based on existing installations and standards.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method of synchronized representation of network contents comprising the steps of:
   requesting service by at least one client of a plurality of clients for a groupwise synchronized representation of network contents by a synchronization server, the network contents being distinct from an access address or URL of the network contents;
   combining specific other clients requested by the at least one client from the plurality of clients in the request for groupwise synchronized representation into a synchronous multimedia session group;
   rerouting at least one request for specific network contents, corresponding to a URL located on an arbitrary network server, by a requesting client belonging to the synchronous multimedia session group to the synchronization server;
   loading the requested specific network contents into the synchronization server;
   forward the requested specific network contents from the synchronization server to the requesting client; and
   prompting all clients belonging to the synchronous multimedia session group by the synchronization server to request the specific network contents in a manner similar to the requesting client.

2. The method according to claim 1, wherein the specific network contents are world wide web contents and the requests are world wide web requests.

3. The method according to claim 1, wherein a connection to the synchronization server is established based on the request by a client for the synchronous multimedia session group and the synchronization server detects whether or not a synchronization module is already statically installed in the client; and
   wherein the synchronization module is dynamically installed in the client when the synchronization server detects that the synchronization module is not already statically installed in the client.

4. The method according to claim 1, wherein a session group login identifier is assigned to the synchronization multimedia session group, the log-identifier being filed in the client of a user and serving to enable any of a plurality of users to resume the synchronous multimedia session group after an interruption of the group.

5. A synchronization server in a service host computer, comprising:
   a combining means for combining a plurality of specific clients into a synchronous multimedia session group based on a request from a client to combine the specific clients into the group;
   a loading means for loading network contents in accordance with a request from a client for a URL from an arbitrary network server on behalf of the synchronous multimedia session group, the network contents being distinct from an access address or URL of the network contents
   a preparation means for preparing the network contents for downloading by any one of the plurality of specific clients belonging to the synchronous multimedia session group; and
   a prompting means for prompting any one of the plurality of specific clients belonging to the synchronous multimedia session group to request the network contents.

6. A synchronization system for use in a network comprising:
   a synchronization server configured for combining a plurality of specific clients into a synchronous multimedia session group based on a request from a client to combine the specific clients into the group, loading network contents in response to a request from at least one client for at least one URL from an arbitrary network server on behalf of the synchronous multimedia session group, the network contents being distinct from an access address or URL of the network contents, preparing the network contents for downloading by any one of the plurality of specific clients belonging to the synchronous multimedia session group and prompting any one of the plurality of specific clients belonging to the synchronous multimedia session group to request the network contents; and
   at least one user terminal comprised of a synchronization module configured to enable at least one of the plurality of specific clients to participate in a service of synchronized representation of data network contents;
   wherein the user terminal forwards a standard request by the at least one of the plurality of specific clients for specific data network contents to the synchronization server and the user terminal prompts a standard request from the at least one of the plurality of specific clients for new contents for synchronized representation as soon as being informed by the synchronization server that there are new contents for synchronized representation.

* * * * *

UNITED STATES PATENT AND TRADEMARK OFFICE
CERTIFICATE OF CORRECTION

PATENT NO. : 6,907,450 B1
DATED : June 14, 2005
INVENTOR(S) : Markus Lautenbacher It is certified that error appears in the above-identified patent and that said Letters Patent is hereby corrected as shown below:

Title page,
Item [57], ABSTRACT,
Please replace the current Abstract with the following:
    -- A method and accompanying apparatus forms a synchronized representation of network contents within a group of users. The synchronized representation is accomplished by utilization of a synchronization server that combines the users into the group. The synchronized representation allows the realization of a series of new applications, such as electronic commerce, electronic consulting, call centers, telelearning, and multimedia hotline. --.

Column 5,
Lines 14-15, please delete "an arbitrary" and insert -- a --.
Line 42, "log-identifier" should read as -- login identifier --.

Column 6,
Lines 4-5 and 24, please delete "an arbitrary" and insert -- a --.
Line 8, after "contents" please insert -- ; --.

Signed and Sealed this

Twentieth Day of September, 2005

JON W. DUDAS
*Director of the United States Patent and Trademark Office*